United States Patent [19]

Bartlett

[11] Patent Number: 4,714,925

[45] Date of Patent: Dec. 22, 1987

[54] LOOP DATA LINK

[75] Inventor: David Bartlett, London, United Kingdom

[73] Assignee: EMX International Limited, Aylesbury, England

[21] Appl. No.: 811,479

[22] Filed: Dec. 20, 1985

[30] Foreign Application Priority Data

Dec. 31, 1984 [GB] United Kingdom ................. 8432807

[51] Int. Cl.[4] ......................... H04Q 7/00; G07B 15/02

[52] U.S. Cl. ........................... 340/825.55; 340/825.54; 235/384

[58] Field of Search ....................... 340/825.55, 825.54, 340/825.31, 825.34, 870.31, 870.32; 235/382, 382.5, 384; 250/341

[56] References Cited

U.S. PATENT DOCUMENTS

| | | | |
|---|---|---|---|
| 3,377,616 | 4/1968 | Auer, Jr. | 340/825.54 |
| 3,752,960 | 9/1973 | Walton | 340/825.54 |
| 3,964,024 | 6/1976 | Hutton et al. | 340/825.34 |
| 4,121,102 | 10/1978 | Wilson | 250/341 |
| 4,209,783 | 6/1980 | Ohyama et al. | 340/825.54 |
| 4,251,797 | 2/1981 | Bragas et al. | 340/825.54 |
| 4,303,904 | 12/1981 | Chasek | 340/825.54 |
| 4,398,172 | 8/1983 | Carroll et al. | 340/825.54 |
| 4,463,353 | 7/1984 | Kuzara | 340/825.54 |
| 4,473,825 | 9/1984 | Walton | 340/825.34 |
| 4,510,495 | 4/1985 | Sigrimis et al. | 340/825.54 |

*Primary Examiner*—Ulysses Weldon
*Assistant Examiner*—Ralph E. Smith
*Attorney, Agent, or Firm*—Barnes & Thornburg

[57] ABSTRACT

Data stored in a logger is transmitted from a vehicle by a responder. The data is received by a transceiver and stored in a device. Data can also be transferred in the reverse direction. An inductive loop is used to sense the presence of the vehicle and, when the vehicle is sensed, to initiate an interrogation of the vehicle. Data transfer takes place only if the vehicle is identified.

3 Claims, 3 Drawing Figures

LOOP DATA LINK

BACKGROUND OF THE INVENTION

This invention relates generally to the transfer of data between two points and more particularly to the transfer of data between a vehicle and a collecting point on a "hands-off" basis.

For effective fleet management it is necessary to be able to monitor and control the operation of each vehicle in the fleet. For example, information which is highly relevant in this regard includes the following for each vehicle: distance travelled by each vehicle, travel time, fuel consumption, number of stops, duration of stops, maximum speed, maximum engine speed, and the like.

With the aid of modern technology this type of information can be collected on board a vehicle. The data can then be transferred from the vehicle to a collecting point and this is normally done through human intervention. It is, however, desirable to be able to transfer such data from a vehicle to a collecting point and, where necessary, to be able to transfer data from the collecting point to the vehicle, with a minimum of human intervention.

SUMMARY OF THE INVENTION

The invention provides a method of transferring data between a vehicle and a collecting point which includes the steps of detecting the presence of a vehicle by means of inductive loop detector means, identifying the vehicle, and, when a vehicle is positively identified, of initiating a transfer of data between the vehicle and the collecting point.

The data may be transferred while the vehicle is within an active area of the inductive loop detector means.

The inductive loop detector means may for example include an inductive loop which is excited at a suitable frequency and means to detect a change in excitation parameters of the loop caused by the presence of the vehicle.

Data may be transmitted from the vehicle to the collection point at a first frequency and may be transmitted in the reverse direction at a second frequency. Preferably the second frequency is substantially higher than the first frequency.

The method may also include the steps of using the inductive loop to receive data transferred to the collecting point, and to transmit data transferred from the collecting point.

The invention also extends to apparatus for transferring data between a vehicle and a collecting point which includes, on the vehicle, a data logger and first transmitting and receiving means, and, at the collecting point, second transmitting and receiving means, means for storing data, an inductive loop, and means for detecting the presence of the vehicle within an active area of the loop, the detection means, upon detecting the presence of the vehicle within the active area, initiating the transmission of a signal, by the second transmitting means, which is received by the first receiving means.

BRIEF DESCRIPTION OF THE DRAWINGS

The invention is further described by way of example with reference to the accompanying drawings in which.

DESCRIPTION OF PREFERRED EMBODIMENT

Figure 1:
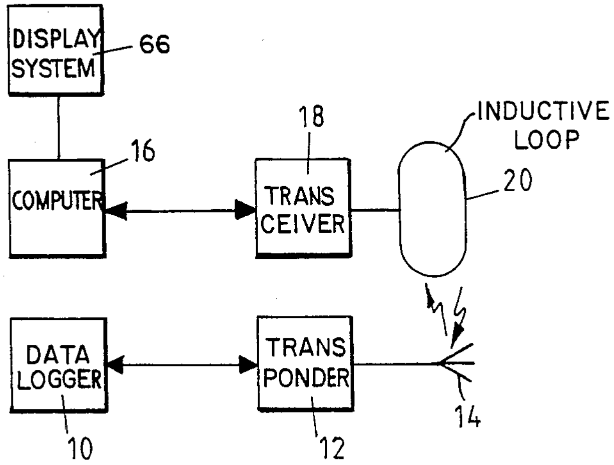
FIG. 1 is a block diagram representation of a system according to the invention.

FIG. 1 illustrates the principles of the invention. A vehicle, not shown, has installed on it a data logger 10 which, in a substantially conventional manner, collects data pertaining to the operation of the vehicle. This data may include the following parameters: the speed of the vehicle, the maximum engine speed of the vehicle, the travelling time of the vehicle, the time for which the vehicle has stopped, the fuel consumption of the vehicle, and the like. The data logger is interfaced with a responder 12 which is shown in more detail in FIG. 2. The responder has an antenna 14 for the two-way transfer of data.

At a collection point, for example in a garage or in a storage yard, a computer 16 is located. The computer is also of conventional construction and therefore is not further described. The computer is connected to a transceiver 18 which is shown in more detail in FIG. 3. The transceiver has at its front end an inductive loop 20 embedded in an area over which the vehicle referred to will be positioned.

In general terms it can be said that data collected in the logger 10 is transmitted by the responder 12 via the antenna 14 to the road loop 20. The received data is then transferred to the computer 16 via the transceiver 18. When operation takes place in the reverse direction, data from the computer is transferred through the various components to the data logger 10.

Figure 2:
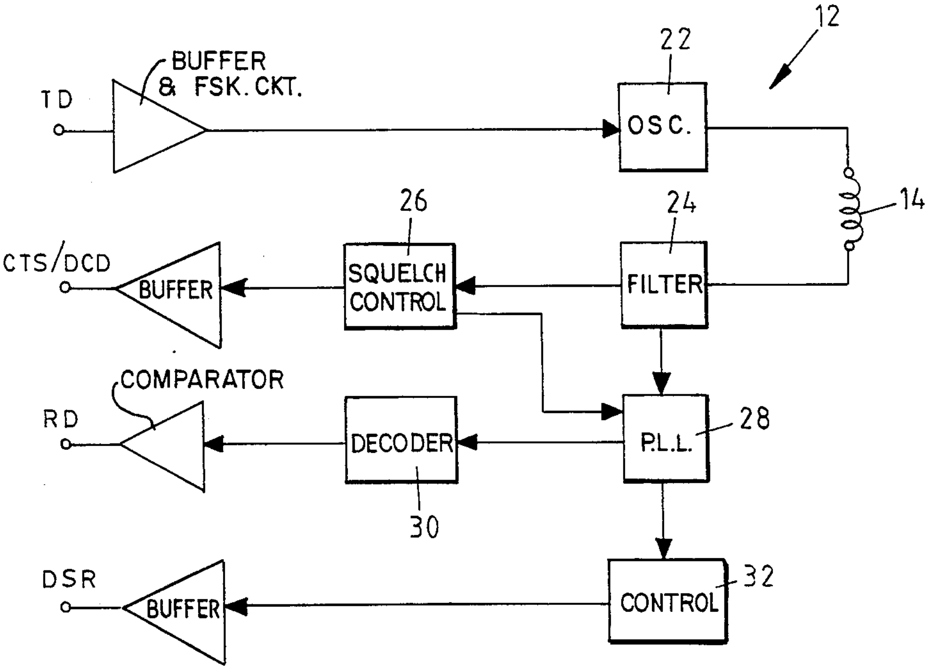
FIG. 2 is a block diagram of part of the system of FIG. 1 installed on a vehicle.

Referring to FIG. 2, the responder 12 includes a keyed oscillator 22, a bandpass filter 24, a squelch control 26, a phase locked loop 28, a decoder 30 and a control circuit 32.

Data collected in the data logger 10 is buffered and the absolute value is used to key the oscillator 22. This oscillator is a sine wave oscillator running at a nominal frequency of 445 kHz for marking input data (binary 0), and approximately 435 kHz for spacing data. The output of the oscillator is buffered and used to drive the coil of the antenna 14 which is wound around the edge of the responder housing. The coil has a resonant frequency of approximately 440 kHz and so data transmission is effective.

The reception of data is achieved in the following way: the antenna coil is capacitively grounded through the input stage of the receiving filter 24, which acts as a relatively high impedence load for the coil at the receiving frequency of approximately 71 kHz. The coil signal is filtered by the filter 24 which is centred on 71 kHz and which has a Q of approximately 3 and an overall gain of approximately 1000. The output is input to the phase locked loop 28 centred on approximately 71 kHz. The phase locked loop is enabled by the squelch gate 26 which also generates clear to send (CTS) and data carrier detect (DCD) control signals. The output of the phase locked loop, i.e. the voltage of the voltage controlled oscillator, is filtered by a bandpass filter in the decoder 30 which has cut off frequencies of approximately 100 Hz and 5 kHz. This output signal is decoded by a Schmitt comparator into binary, or received, data (RD).

The phase locked loop output is also decoded by the control circuit 32 to provide a data set ready signal (DSR) once a frequency lock has been achieved within a satisfactory frequency band of the phase locked loop 28.

Figure 3:
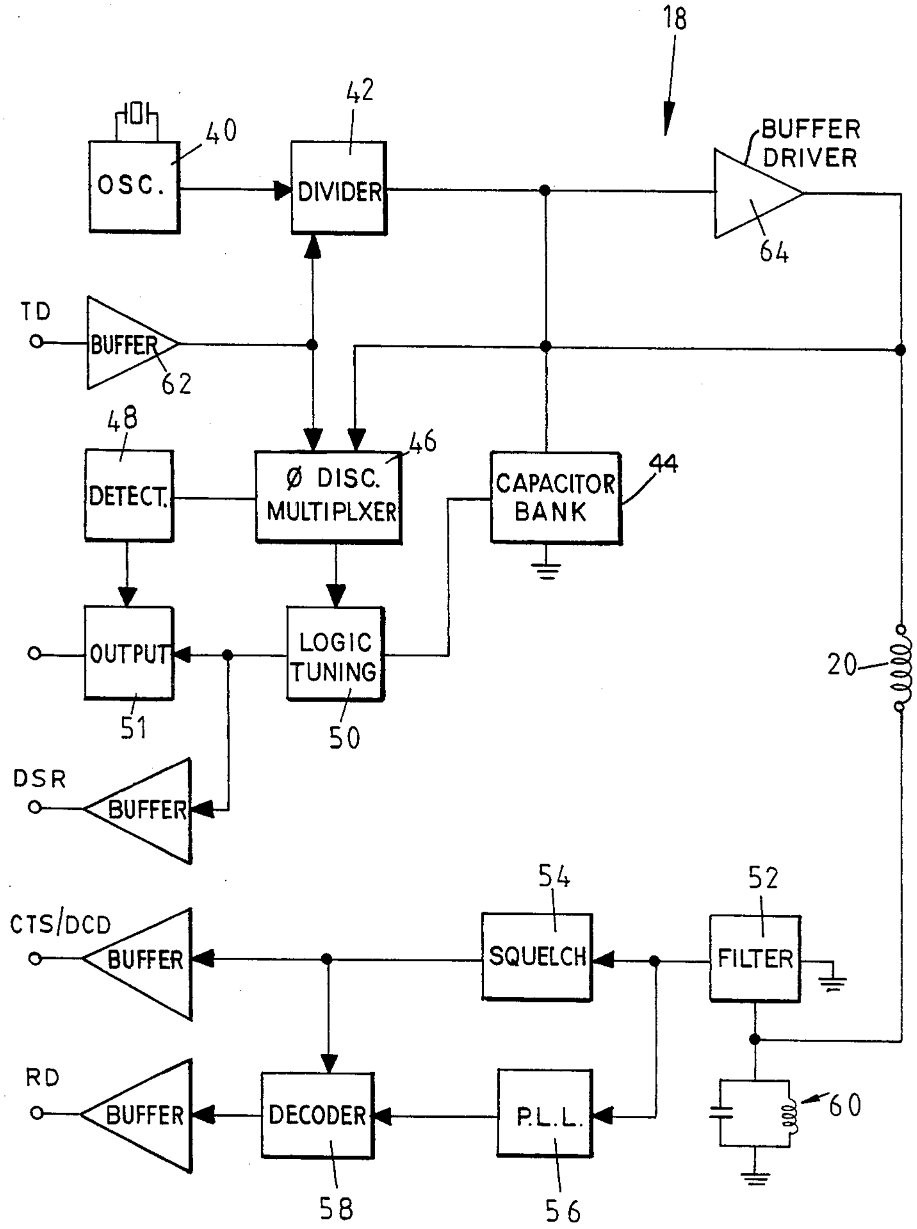
FIG. 3 is a block diagram of part of the system of FIG. 1 installed at a collecting point.

The roadside unit, i.e. the transceiver shown in FIG. 3, includes the following components: an oscillator 40, a programmable divider 42, a bank of capacitors 44, a phase discriminator and multiplexer 46, a detector circuit 48, a logic tuning circuit 50, an output circuit 51, a filter 52, a squelch control 54, a phase locked loop 56 and a decoder 58. A resonant circuit 60 is connected to the filter 52.

When the transceiver 18 is in the transmit mode, data (TD—transmit data) is buffered in a buffer 62 and the digital value is used to key the programmable divider 42. This divider divides down a 4.43 MHz crystal oscillator frequency, derived from the oscillator 40, to give frequencies of 69.22 kHz and 73.83 kHz respectively, which represent the marking and spacing frequency conditions. The oscillator has a square wave output which is buffered by a fairly low impedance driver 64 which drives the inductive loop 20, which is of a conventional construction having an inductance in the range of from 40 to 700 microhenries.

The road loop is tuned by the bank of capacitors 44. The capacitors are automatically selected on reset by the self tuning logic circuit 50 and the phase discriminator 46. The tuned state of the front end is used to generate the data set ready (DSR) signal once the unit is satisfactorily tuned.

In the receiving mode the loop is grounded at the non-driven end via the LC parallel network 60 which has a resonant frequency of 440 kHz. The network 60 thus provides a low impedance path for the 71 kHz loop driving signal, and a high impedance load for the received 440 kHz signal. The received signal is input to the front end filter 52 which is a bandpass filter for the 440 kHz narrow band FM signal. The output of the filter drives the phase locked loop 56 which is used to decode the received signal.

The output of the filter is also used to drive the squelch circuit 54 which enables the data decoder 58 and also provides the clear to send (CTS) and data carrier detector (DCD) outputs.

The output of the phase locked loop 56 is decoded into digital data by the decoder 58 which provides the received data (RD) from the transceiver.

The transceiver also includes a loop detector function. The principle of operation is based on a phase change measurement technique. The phase discriminator 46 is used to generate a voltage which is proportional to phase and thus, via the circuit 51, provides a measure of the change in inductance of the loop caused when a vehicle is positioned in an active area of the loop. The phase discriminator is multiplexed by the data stream in such a way that the measurement for the detector function occurs only when the data is in the marking state.

The self tune circuit 50 ensures that the resonant frequency is changed by capacitor switching in the capacitor bank 44.

In more general terms, it can be said that when a vehicle which contains the data logger 10 comes within the active area of the loop 20, the presence of the vehicle is detected. The identity of the vehicle is then requested. The vehicle, if it is fitted with a responder of the kind shown in FIG. 2, then responds by transmitting an identity code. If the code is positively recognised then the transceiver 18 requests the vehicle to transmit the information contained in the data logger. The transfer of data from the transponder 12 to the transceiver 18 then takes place. The information is received and is transmitted to the computer 16 where it is stored.

When the vehicle leaves the active area of the loop 20, the absence of the vehicle is again detected and the vehicle is logged as having departed.

The invention lends itself to a number of variations and developments. In particular the apparatus at the collecting point, consisting of the components 16, 18 and 20, may be one of a plurality of similar arrangements which are located at selected locations and which are connected to a central computer and display system 40. The display system 40 includes a screen or similar device which gives a geographical indication of the locations, and this, together with the information collected by the computers 16, in respect of a given vehicle, makes it possible to display the movement and position of the vehicle over a predefined area.

I claim:

1. Apparatus for transferrring data between a vehicle and a collecting point comprising: on the vehicle, a data logger and first transmitting and receiving means, and, at the collecting point, second transmitting and receiving means, means for storing data, an inductive loop, and detection means for detecting the presence of the vehicle within an active area of the loop, the detection means, upon detecting the presence of the vehicle within the active area, initiating the transmission of a signal, by the second transmitting means, which is received by the first receiving means, the detection means including a phase discriminator for detecting a change in the inductance of the loop, data from the storage means which is transmitted by means of the second transmitting means being used to multiplex the phase discriminator in marking and spacing conditions, the loop inductance being measured only when the data is in the marking condition.

2. Apparatus according to claim 1 wherein the second receiving means is adapted to receive a signal, containing data from the data logger, which is transmitted by the first transmitting means.

3. Apparatus according to claim 1 wherein the first and second transmitting means transmit at first and second frequencies respectively, which differ substantialy from each other, the apparatus including a network, which has a low impedance at the second frequency and a high impedance at the first frequency, which couples the loop to the second receiving means.

* * * * *